United States Patent
Valisko

(10) Patent No.: US 6,516,613 B1
(45) Date of Patent: Feb. 11, 2003

(54) EXHAUST MANIFOLD DEVICE

(76) Inventor: Steven Valisko, 21 C, Glamour Court, Discovery Bay, Lantau Island (HK)

( * ) Notice: Subject to any disclaimer, the term of this patent is extended or adjusted under 35 U.S.C. 154(b) by 0 days.

(21) Appl. No.: 09/857,683

(22) PCT Filed: Dec. 1, 1999

(86) PCT No.: PCT/GB99/04018

§ 371 (c)(1), (2), (4) Date: Aug. 13, 2001

(87) PCT Pub. No.: WO00/36283

PCT Pub. Date: Jun. 22, 2000

(30) Foreign Application Priority Data

Dec. 11, 1998 (GB) .............................. 9827392

(51) Int. Cl.⁷ ................................. F01N 3/10
(52) U.S. Cl. ................. 60/304; 60/305; 60/306; 60/307; 60/308
(58) Field of Search ................... 60/304, 305, 306, 60/307, 308

(56) References Cited

U.S. PATENT DOCUMENTS

| | | | | |
|---|---|---|---|---|
| 3,871,175 A | * | 3/1975 | Yamamoto | 137/512.3 |
| 4,027,478 A | * | 6/1977 | Masaki et al. | 60/285 |
| 4,102,126 A | * | 7/1978 | Miyagi | 60/276 |
| 4,162,613 A | * | 7/1979 | Tamura et al. | 60/278 |
| 4,342,194 A | * | 8/1982 | Paddock et al. | 137/455 |
| 5,177,958 A | * | 1/1993 | Clemens et al. | 60/290 |
| 5,203,872 A | * | 4/1993 | Naffziger | 60/293 |
| 5,499,502 A | * | 3/1996 | Haniu et al. | 60/278 |
| 5,699,664 A | * | 12/1997 | LaFleur | 137/512.3 |

\* cited by examiner

*Primary Examiner*—Thomas Denion
*Assistant Examiner*—Diem Tran
(74) *Attorney, Agent, or Firm*—Jackson Walker L.L.P.

(57) ABSTRACT

An exhaust manifold device is provided to allow air to enter an exhaust manifold during normal operation or an engine to prevent exhaust gases being sucked into the cylinders via exhaust valves. Air can be supplied, via valves (18 and 21) to the exhaust manifold as required and, is supplied to the valve (21) at pressures, above atmospheric pressure, that increase with engine speed. Synchronized electrical pulses are supplied to a solenoid (18A) to open the valve (18).

11 Claims, 4 Drawing Sheets

EXHAUST MANIFOLD DEVICE

The invention relates to exhaust manifold devices.

In U.S. Pat. No. 3,871,175, a secondary air supply system is described that supplies air to an exhaust manifold to provide sufficient air to oxidise any unburnt exhaust gases at lower engine speeds.

The invention relates more particularly to devices that are arranged to automatically allow air to enter the exhaust manifold to prevent inter alia exhaust gases being sucked into engine cylinders during the normal operation of the engine. Such devices or aspirators have been disclosed already in, for example, U.S. Pat. No. 3,455,106 and European Patent 0041831. Devices so far proposed comprise relatively complicated mechanical arrangements and do not operate efficiency at higher engine speeds or at a variety of engine speeds.

It is an object of the invention to overcome or at least reduce these problems.

According to the invention there is provided an aspirator for allowing air automatically to selectively enter an engine exhaust manifold during operation of an internal combustion engine to inhibit exhaust gases being drawn back into the cylinders via exhaust valves, the aspirator comprising an adapter formed by a hollow body that extends to a port fitted in communication with the manifold, a first one way valve fitted to the adapter that prevents gases leaving the manifold through the port when the pressure inside the manifold is greater than the pressure at the first valve, and means for supplying air to a second one way valve at different pressures, above atmospheric pressure, that increase with increases of speed of the engine, in which the second one way valve is connected by a passageway to the first valve forming an intermediate expansion chamber, the second one way valve being arranged to allow air to enter the passageway whenever the pressure inside the passageway is less than the pressure at the second valve, including means for supplying electrical signals synchronised with exhaust valve operation to open the first one way valve.

The port is preferably formed in a tube that extends somewhat in to the manifold beyond its inner surface.

The one way valves may each comprise a needle valve.

The position of the second one way valve may be manually adjustable to vary the differential pressure at which the second valve opens and closes.

The air may be supplied to the second one way valve by an air ram having an inlet exposed forwardly in a vehicle in which the engine is mounted so as to provide air at a pressure corresponding to the forward speed of the vehicle.

The air may also or alternatively be supplied by an air pump, and the air pump may form part of a turbo charger for the engine.

The means for supplying electrical signals may comprise an engine ignition unit.

The means for supplying synchronised electrical signals may comprise a pressure sensitive switch mounted in communication with the exhaust manifold, and include a normally-open electrical switch arranged to close in accordance with pressure in the manifold reducing to a predetermined pressure.

The means for supplying synchronised electrical signals may include markers mounted on a flywheel of the engine.

An exhaust manifold aspirator according to the invention will now be described by way of example with reference to the accompanying schematic drawings in which.

Figure 1:
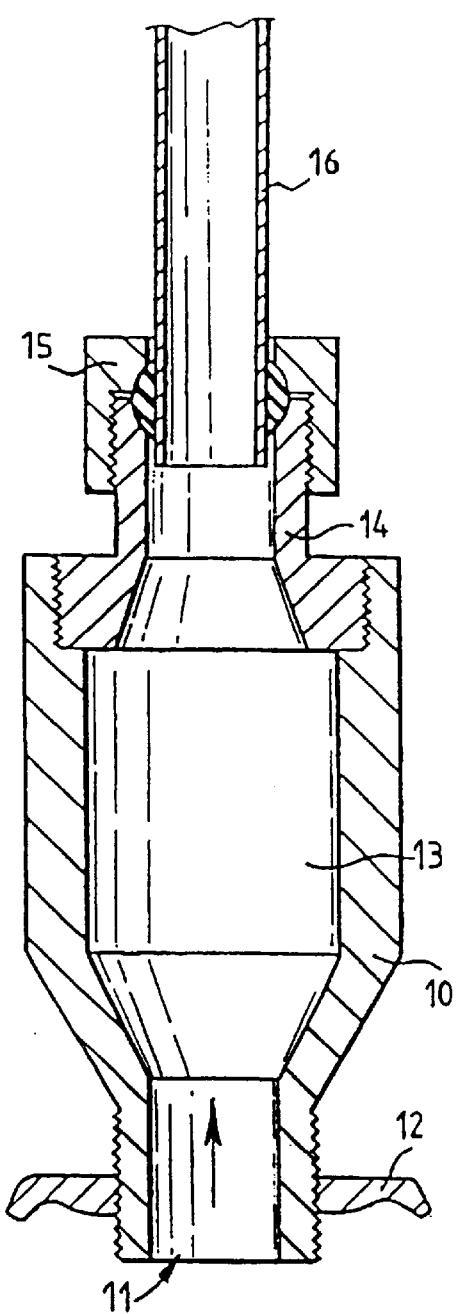
FIG. 1 is a sectional side view of an adapter of the device.

Referring to the drawings, in FIG. 1 the adapter comprises a lower part 10 including a port 11 that screw fits to an engine manifold 12. The lower part incorporates an expansion chaser 13 that is closed of f by hollow cap 14 extending up to a gland fitting 15 which seals and connects the cap 14 to a cylindrical tube 16.

It will be noted that the bottom edge of the port 11 extends somewhat into the manifold 12 and beyond its inner surface. This makes the port more sensitive to the flow of gases and pressure in the manifold. Also, hot exhaust gases are less inclined to be swept into the port 11 and corrode valve seatings in the device. The provision of the expansion chamber 13 ensures that any flow of air towards the manifold is accelerated and so "rammed" through the port 11, when required, into the manifold.

Figure 2:
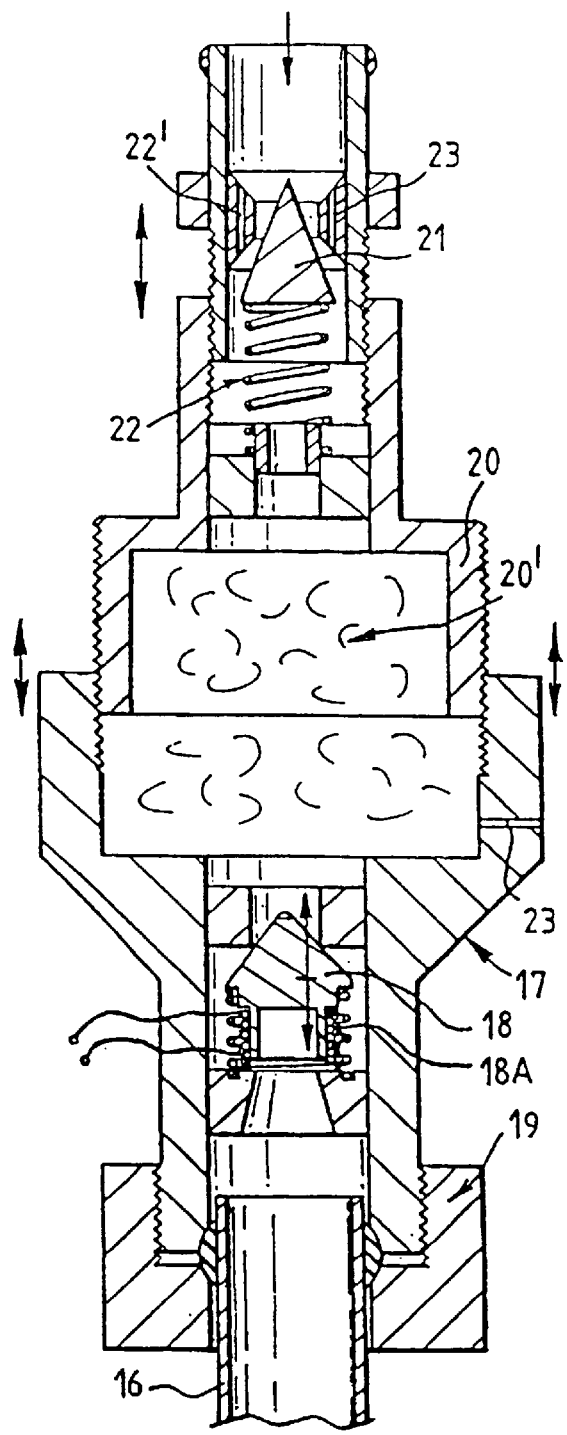
FIG. 2 is a sectional side view of the device which fits above the adapter in use.

In FIG. 2, the tube 16 is attached to a lower housing 17 incorporating a first one way needle valve 18 by a gland coupling 19. The needle valve has a lower hollow shaft that is surrounded by an electrical coil to form a solenoid 18A. An upper housing 20 is slidably or otherwise adjustably attached to the lower housing 17 so that the housings together form an expansion chamber 20'. The effective size or capacity of the chamber 20' can be varied as and when required but serves as a pressure damper between the first valve is and a second one way needle valve 21. The valve 21 is biassed by a spring 22 and fitted to an upper end of the housing 20 by a screw thread so that manually adjustment can be made to increase or decrease the effective spring bias. This adjustment enables the differential pressure at which the valve 21 opens and closes to be varied. The device includes two high pressure bi-pass and relief ports 22 and 23.

In general, the device is provided to allow air to enter the exhaust manifold from atmosphere via the valves 18 and 21 as and when required, and as already known in principle in the prior art. In devices of the present invention air is supplied to the valve 21 under pressure when the engine speeds up so that a supply of pressurised air is provided through the port 11 to ensure efficient operation at all times. The pressurised air is preferably supplied for the exhaust of a moving vehicle by feeding air from a forward facing inlet. Thus, as vehicle speeds up the pressure of the air supplied to the valve 21 automatically increases to correspond to the engine speed and provide a supply of increased pressurised air to the port 11 as desired. The pressurized air can also be supplied from an electric fan, say, or a turbo charger fan, as shown in FIG. 4.

In practice, it is helpful to assist opening of the valve 18 by supplying synchronized electrical pulses to the solenoid 18A, especially at higher engine speeds. For this purpose, an electrical signal or pulse generator is provided that is triggered by and is suitably synchronized with ignition pulses supplied to the sparkplugs of the engine. As a result the valve 18 is opened to allow air to enter respective cylinders as required.

Figure 3:
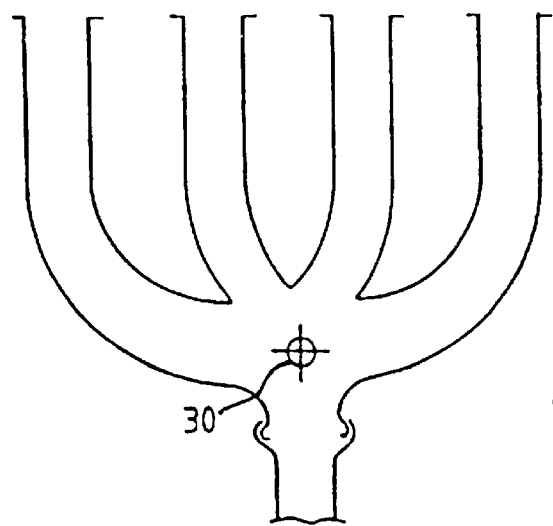
FIG. 3 is a top plan view of an exhaust manifold.

FIG. 3 shows at 30, a central preferable location for fitting the device to a manifold of a four cylinder engine. The location is chosen to coincide with a region where the flow of exhaust gases is mixed generally evenly from all four cylinders. It is of course possible to use other locations or provide more than one device in which case the choice of location will depend on which and on how many cylinders are served by each device.

Figure 4:
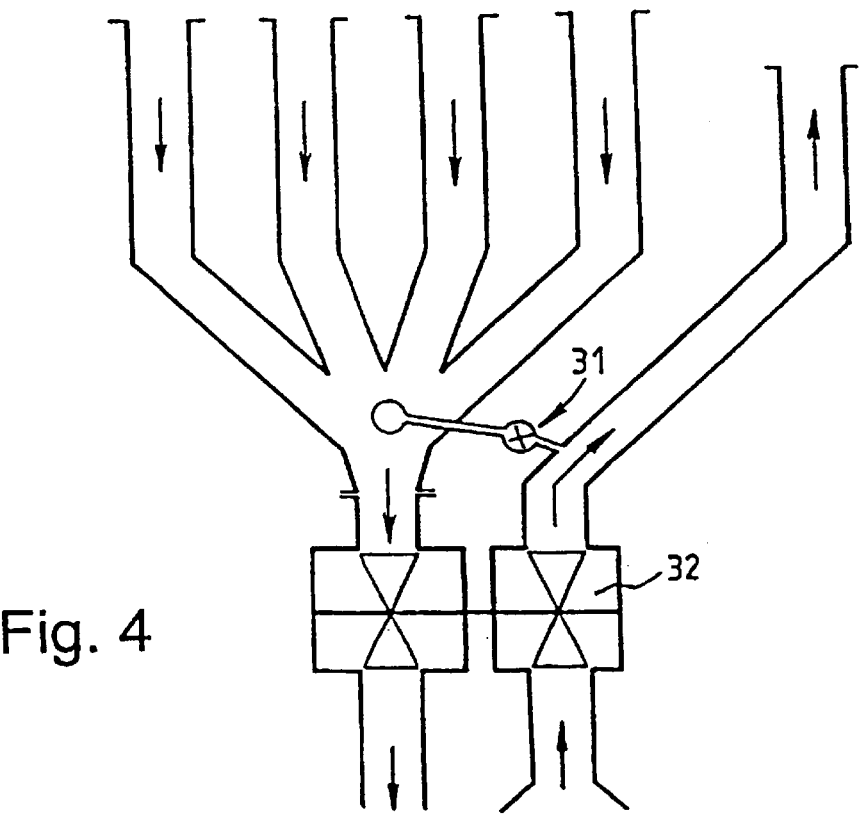
FIG. 4 is a top plan view of the device in a turbo charger application of the device.

In FIG. 4, the device of the invention is provided with air at elevated pressure as required from a bleed-valve 31 connected to an outlet of a turbo charger fan 32. The outlet air is normally fed to force fuel-air mixture into the engine cylinders but a sufficient amount is used, that is diverted or bled, to create a supply and elevated pressure of air at the inlet to the needle valve 18 of the device.

Figure 5:
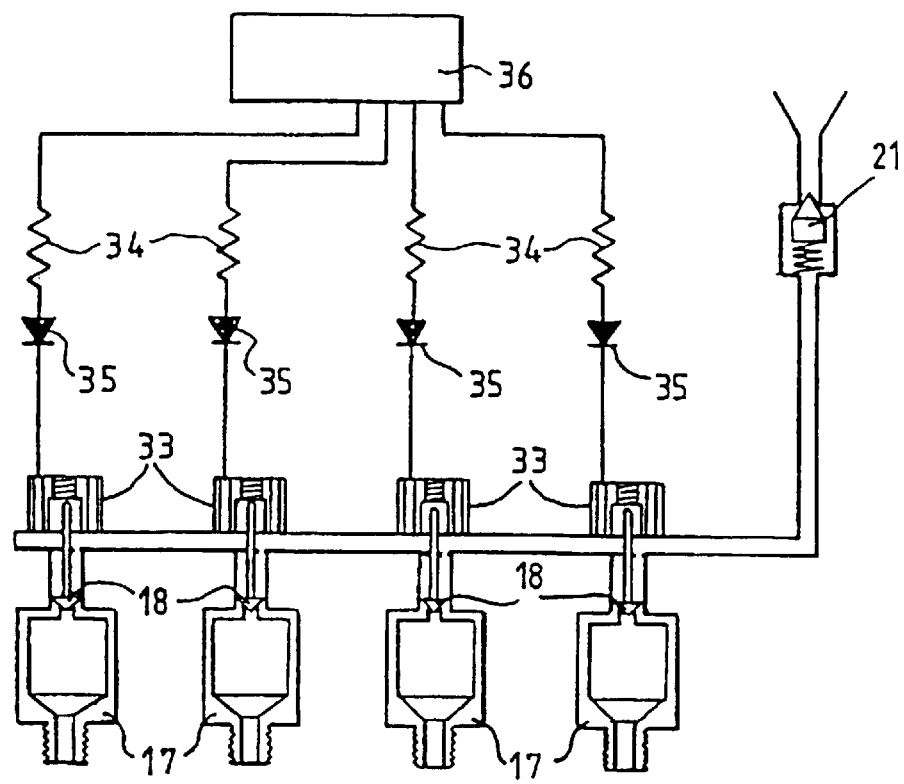
FIG. 5 is a schematic diagram of parts of an aspirator showing electrical components incorporated in the aspirator.

In FIG. 5, the needle valves 18 and 21 are shown. Each valve 18 is provided with a spring biassed operating solenoid 33 The solenoids 18 are electrically emitted in practice to an engine manifold (not shown) into which the aspirators housings 17 are screwed. Electrical wires 34 each containing a series resistor 35 and diode 36 extend from the solenoids 33 to an electronic ignition unit 36 of the engine. In practice the ignition unit supplies synchronised electrical pulses to each respective of the solenoids 33 so that the valves 18 are opened as required to allow air to enter the manifold.

The ignition unit 36 may be arranged to provide the signal only when required, in the sense that the user may disengage the aspirator operation of the ignition unit. More usually, the ignition unit is arranged however to supply the pulses to the solenoids at certain ranges of the engine speed, for example at low to medium speeds when problems of exhaust gases entering the engine are usually more prevalent.

Figure 6:
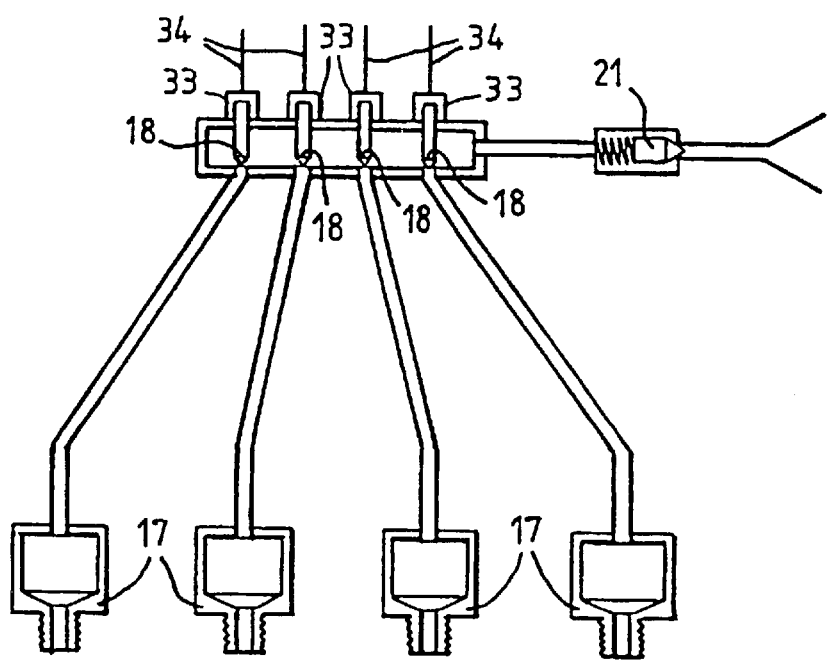
FIG. 6 is a similar schematic diagram to FIG. 5 of another aspirator.

In FIG. 6, the aspirator is generally the same as shown in FIG. 5 except the valves 18 are mounted in a common valve chest. As before synchronised electrical pulses are provided from an ignition unit to open the valves in sequence and at correct instances of time.

Figure 7:
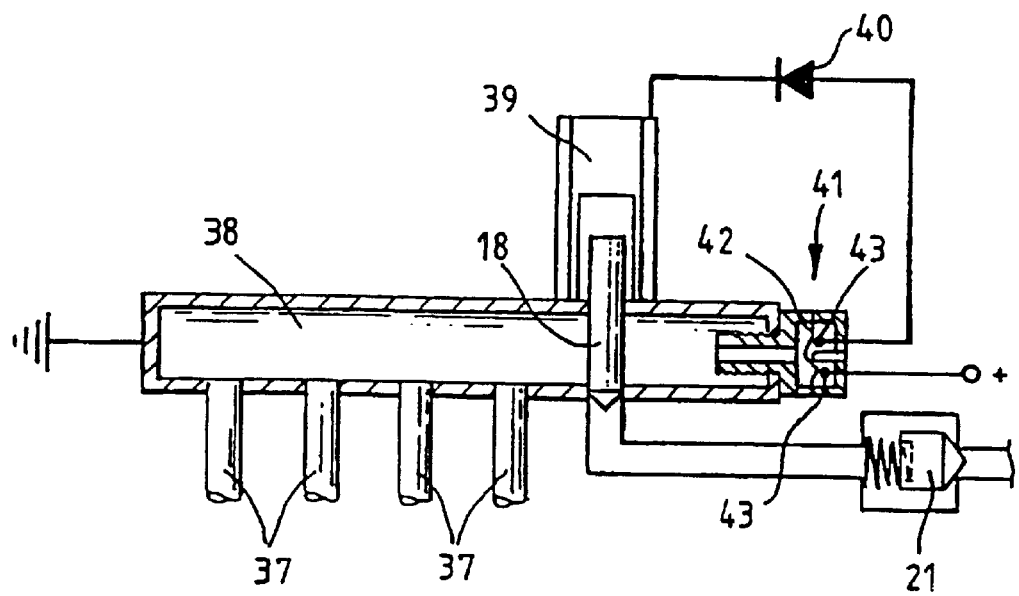
FIG. 7 is another similar diagram to FIG. 1 of a further aspirator.

In FIG. 7, a single valve 18 releases air from the valve 21 to four engine cylinders (not shown) connected via respective tubular passages 37 from a chamber 38. The valve 18 is opened as required, and as before in synchronised fashion, by a solenoid 39. The solenoid 39 is controlled by electrical power supplied via a diode 40 and a pressure sensor switch 41. The sensor switch 41 includes a conductive resilient baffle plate 42 that shorts across switch terminals 43 to provide automatically a synchronised interrupted flow of current to the solenoid 13 as the gas pressure in the chamber 38 fluctuates. It will be appreciated that the aspirator shown in FIG. 7 can be used for a diesel engine that does not have an ignition unit.

Various other means of supplying electrical pulses to open the valve 18 may be used. For example, synchronised electrical pulses can be generated by responding to electrical, magnetic or other markers including light reflectors mounted a surface of a flywheel of the engine.

It will also be appreciated that a single aspirator unit can be provided for each cylinder of an engine each having dedicated or respective valves 18 and 21 The aspirators can also be provided to serve multiple cylinders as described, or in some cases four cylinders each, with two aspirator sets for an eight cylinder engine, this is the preferred arrangement for v-eight engine.

What is claimed is:

1. An aspirator for allowing air automatically to selectively enter an engine exhaust manifold during operation of an internal combustion engine to inhibit exhaust gases being drawn back into the cylinders via exhaust valves, the aspirator comprising an adapter formed by a hollow body that extends to a port fitted in communication with the manifold, a first one way valve fitted to the adapter that prevents gases leaving the manifold through the port when the pressure inside the manifold is greater than the pressure at the first valve, and means for supplying air to a second one way valve at different pressures, above atmospheric pressure, that increase with increases of speed of the engine, in which the second one way valve is connected by a passageway to the first valve forming an intermediate expansion chamber the second one way valve being arranged to allow air to enter the passageway whenever the pressure inside the passageway is less than the pressure at the second valve; including means for supplying electrical signals synchronised with exhaust valve operation to open the first one way valve.

2. An aspirator according to claim 1, in which the port is formed in a tube that extends somewhat into the manifold beyond its inner surface.

3. An aspirator according to claim 1 in which the one way valves each comprise a needle valve.

4. An aspirator according to claim 1 in which the position of the second one way valve is manually adjustable to vary the differential pressure at which the second valve opens and closes.

5. An aspirator according to claim 1 in which the air is supplied to the second one way valve by an air ram having an inlet exposed forwardly in a vehicle in which the engine is mounted so as to provide air at a pressure corresponding to the forward speed of the vehicle.

6. An aspirator according to claim 1 in which the air is supplied by an air pump.

7. An aspirator according to claim 6, in which the air pump forms part of a turbo charger for the engine.

8. An aspirator according to claim 1, in which air is supplied to the second valve corresponding to all speeds of the engine.

9. An aspirator according to claim 1 in which the means for supplying electrical signals comprises an engine ignition unit.

10. An aspirator according to claim 9, comprising a normally-open electrical switch arranged to close in accordance with pressure in the manifold reducing to a predetermined pressure.

11. An aspirator according to claim 1 in which the means for supplying synchronised electrical signals includes markers mounted on a flywheel of the engine.

* * * * *